United States Patent Office 2,898,212
Patented Aug. 4, 1959

2,898,212

PRESERVATION OF CURED MEAT COLOR

Floyd C. Olson, Madison, Wis., and Earl W. Turner, Park Forest, Ill., assignors to Oscar Mayer & Co., Inc., Chicago, Ill., a corporation of Illinois No Drawing. Application October 14, 1955
Serial No. 540,638

5 Claims. (Cl. 99—174)

The present invention relates generally to the treatment of cured meats to preserve the cure color and prevent fading. More specifically, it is directed to the treatment of self-service packaged cured meats so as to tie up available molecular oxygen within the package and prevent oxidation of the cured meat pigments resulting in the fading of the cure color.

When cured meat products such as bacon, ham or sausage are exposed to light the bright red cure color fades rapidly. The faded product no longer appears fresh and attractive and the flavor as well as the sales appeal suffer as a result of the change in color. Fading is considered to be caused by a light catalyzed oxidation of the heme cure pigment nitrosomyoglobin to a brown pigment metmyoglobin. The packaging of cured meat products in hermetically sealed film does not alleviate the problem of the fading of the heme cure pigment upon the exposure of the package to light. No known commercial methods of packaging cured meats in transparent film or containers are capable of overcoming the problem of fading. Various efforts have been made to solve this problem, including subjecting the meat itself to a treatment which will minimize or prevent fading. During the curing of meat the pigments undergo changes of such a nature that their chemistry is somewhat difficult to ascertain. Therefore, it has been difficult to locate substances which are capable of preventing or substantially retarding the fading of the cure color.

It is a general object of the present invention to treat cured meat in such a manner as to prevent or substantially reduce the fading of the cure color upon exposure of the meat to light.

A further object is to provide an improved cured meat packaged product formed from packaging material relatively impermeable to oxygen, the package having therein a quantity of meat treated with a deoxygenation system capable of adequately preventing the rate of fading of the color of the cure pigments upon the subjecting of the package and its cured meat contents to the action of light.

A more specific object of the invention is the provision of self-service packages of cured meat products wherein relatively impermeable transparent film material is used as the main packaging material and wherein the contents are protected against fading by the presence of a small amount of substances together constituting an efficient oxygen scavenger or getter system for the package.

Other objects not specifically set forth will become apparent from the following detailed description.

In attempting to locate agents capable of protecting the heme cure pigment nitrosomyoglobin from oxidation to the brown pigment metmyoglobin many different easily oxidizable agents have been unsuccessfully tried including ascorbic acid. This compound is known for its ability to become oxidized in preference to other oxidizable material present. Ascorbic acid was applied to the surface of a cured meat product following which the treated surface was subjected to light catalyzed oxidation conditions.

The following example illustrates the inability of ascorbic acid to prevent the fading of the cure color of cured meats when a package of treated meat is subjected to light oxidizing conditions.

*Example I*

The outer surface of a top slice of a stack of superimposed slices of freshly cured ham was sprayed and coated with a solution containing 5 grams ascorbic acid per 100 ml. water. The solution was sprayed with an atomizer and approximately 0.5 ml. of solution was deposited on the top slice. The stack of sliced ham was then packaged in a known manner using Saran film and stored for four days in the dark at a temperature of approximately 0°–5° C. Following storage the package was deposited in an illuminated self-service case. The ascorbic acid did not maintain the cure color to any great extent and the product faded within 24 hours.

The essence of the present invention lies in the discovery that the fading of the cure color of meat can be prevented or substantially reduced by treating the cured meat with ascorbic acid plus catalase enzyme. As illustrated in Example I, ascorbic acid alone is virtually ineffective in retaining the cure color of meat when such meat is packaged in substantially air impermeable material and the package is subjected to light as is customary when such packaged products are placed on display in self-service counters. While ascorbic acid is generally considered to be capable of maintaining a reducing atmosphere with respect to its surroundings it nevertheless is incapable of alone maintaining a type of reducing atmosphere adapted to control the light catalyzed oxidation process normally occurring in packaged cured meat.

Many of the packaging materials used today in forming self-service packaged meats are relatively oxygen-impermeable. However, even with the availability of highly improved packaging techniques it is not practical to use these films in forming an oxygen-free package. As a result the minute quantity of oxygen present within the package is catalyzed by the action of light once the package is placed on display and oxidation occurs which is detrimental to the cure color of the meat as previously described. In view of this situation it is desirable to deposit a quantity of ascorbic acid and catalase enzyme within the package prior to the sealing thereof.

It has been found that the use of ascorbic acid and catalase enzyme is very effective in substantially reducing the fading of the cure color of meat. Bacon, ham and various sausage products treated with ascorbic acid plus catalase enzyme maintain a bright red cure color and are free of mold growth for three to four weeks whereas untreated meat packages fade within a few hours. The amount of ascorbic acid required depends upon the small amount of air trapped in the package during the packaging operation and the small amount that may leak in thereafter. It is generally considered that two molecules of ascorbic acid are required per oxygen molecule and it has further been found that approximately 7.5 mg. of ascorbic acid is required for a self-service package. It has also been found that catalase enzyme may be used in concentrations of approximately 0.3 Katalasefahigkeit unit per sq. in. of self-service package film surface exposed to light or approximately 0.25 mg. crude beef liver catalase enzyme having a Kat. f. value of 1200. Both ascorbic acid and catalase enzyme are edible and completely harmless.

To illustrate the color retention properties of ascorbic acid and catalase enzyme in the treatment of cured meats, the following examples are set forth. However it should be understood that these examples are merely illustrative of the principles of the present invention and should not be construed as limiting thereto.

Example II

The top surfaces of a plurality of slices of bacon arranged in shingled formation for packaging were treated with an aqueous suspension containing approximately 1.25 micrograms of catalase enzyme (Kat. f. value of 1200 or 0.0015 Kat. f. unit) and approximately 7.5 mg. of ascorbic acid per ml. This suspension was sprayed onto the bacon in an amount equal to approximately 2 ml. per pound. The bacon was then hermetically packaged in Saran film and placed in a darkened storage area maintained at approximately 4.5° C. After 48 hours the package was put in an illuminated self-service counter. The package was periodically checked for fading while maintained in the illuminated self-service counter with the result that no fading had occurred after several weeks.

Example III

The top surface of a plurality of slices of Cleveland Bologna arranged in a stacked formation of packaging was treated with an aqueous suspension containing approximately 12.5 mg. of catalase enzyme (Kat. f.=1200) and 25 mg. of ascorbic acid per ml. This suspension was sprayed on the Bologna in an amount equivalent to approximately 2 ml. per pound. The Bologna was then hermetically packaged in Saran film and placed in a darkened storage area maintained at approximately 4.5° C. After 48 hours the package was put in an illuminated self-service counter. The package was periodically checked for fading while maintained in the illuminated self-service counter with the result that no fading of the original cure color had occurred after several weeks.

Example IV

The top surface of a plurality of slices of ham arranged in a stacked formation for packaging was treated with an aqueous suspension containing approximately 12.5 mg. of catalase enzyme (Kat. f.=1200) and 50 mg. of ascorbic acid per ml. This suspension was sprayed on the ham in an amount equivalent to approximately 2 ml. per pound. The ham was then hermetically packaged in Saran film and placed in a darkened storage area maintained at approximately 4.5° C. After 48 hours the package was put in an illuminated self-service counter. The package was periodically checked for fading while maintained in the illuminated self-service counter with the result that no fading of the original cure color had occurred after several weeks.

The ascorbic acid and catalase may be applied to the meat in any suitable manner. Any type of flexible packaging material having suitable properties may be used in forming packages of cured meat products treated in accordance with the principles of the present invention. It has been found that material having an oxygen transmissivity not exceeding approximately 35 cc. air/mil. thickness/100 sq. in./24 hours at 75° F. and 50% relative humidity may be used successfully with the ascorbic acid-catalase protective system of this invention.

Catalase is an enzyme found in practically all forms of life except the anaerobic microorganisms. The measure of catalase activity is determined in Kat. f. units which means "Katalasefahigkeit," or catalase activity, or simply catalase purity. This method is described on page 218 of Chemistry and Methods of Enzymes by James B. Sumner and G. Fred Somers (Academic Press, Inc., New York, 1953). The method was originally proposed by H. van Euler and K. Josephson in Annalen, vol. 452, p. 158 (1927).

Because of its commercial availability at reasonable cost and with excellent quality and uniformity, Saran film constitutes a preferred film for use in practicing the present invention. It is well known that Saran is a polyvinylidene chloride film.

Obviously many modifications and variations of the invention as hereinbefore set forth may be made without departing from the spirit and scope thereof, and therefore only such limitations should be imposed as are indicated in the appended claims.

We claim:

1. A method of retaining the cure color of cured meats packaged in flexible transparent film having an oxygen transmission rate not exceeding approximately 35 cc. air/mil. thickness/100 sq. in./24 hours at 75° F. and 50% relative humidity, said method comprising incorporating in the cured meat package ascorbic acid and catalase enzyme at a level sufficient to retard substantial cure color fading.

2. A method of reducing the fading of the cure color of cured meats comprising treating the meat with a quantity of ascorbic acid and catalase enzyme and thereafter packaging the treated meat in flexible transparent material, the level of ascorbic acid and catalase enzyme treatment being sufficient to retard substantial cure color fading upon exposure of said meat to light, said packaging material having an oxygen transmission rate not exceeding approximately 35 cc. air/mil. thickness/100 sq. in./24 hours at 75° F. and 50% relative humidity.

3. A method of reducing the fading of the cure color of cured meats comprising packaging the meat in flexible transparent material having an air transmissivity rate of no greater than 35 cc. air/mil. thickness/100 sq. in./24 hours at 75° F. and 50% relative humidity with a quantity of ascorbic acid and catalase enzyme associated therewith and thereafter storing the packaged meat in the absence of light for a period sufficient to substantially reduce the amount of free oxygen in the package.

4. A method of forming a package of cured meat protected against substantial fading of the cure color comprising forming a stack of slices of the meat, treating the exposed surface of each end slice with a relatively small quantity of ascorbic acid and catalase enzyme, packaging the treated stack in flexible transparent material having an air transmissivity rate of no greater than 35 cc. air/mil. thickness/100 sq. in./24 hours at 75° F. and 50% relative humidity, and thereafter storing the packaged meat in the absence of light for a period sufficient to substantially reduce the amount of free oxygen in the package.

5. A cured meat packaged product protected against the fading of the cure color by having incorporated therein a relatively small quantity of ascorbic acid and catalase enzyme capable of retarding substantial cure color fading, the packaging material being flexible and transparent having an air transmissivity rate of no greater than 35 cc. air/mil. thickness/100 sq. in./24 hours at 75° F. and 50% relative humidity.

References Cited in the file of this patent

UNITED STATES PATENTS

| | | |
|---|---|---|
| 2,482,724 | Baker | Sept. 20, 1949 |
| 2,541,572 | Coleman et al. | Feb. 13, 1951 |
| 2,668,403 | Rumsey | Feb. 9, 1954 |
| 2,707,154 | Lehmann et al. | Apr. 26, 1955 |
| 2,744,017 | Baldwin | May 1, 1956 |